Feb. 14, 1961  R. BODEMULLER  2,971,338
GAS TURBINE ACCELERATION CONTROL
Filed Dec. 6, 1954  3 Sheets-Sheet 1

INVENTOR.
RUDOLPH BODEMULLER
BY
ATTORNEY

Feb. 14, 1961   R. BODEMULLER   2,971,338
GAS TURBINE ACCELERATION CONTROL
Filed Dec. 6, 1954   3 Sheets-Sheet 3

INVENTOR.
*RUDOLPH BODEMULLER*
BY
*Robert C. Smith*
ATTORNEY

United States Patent Office 2,971,338
Patented Feb. 14, 1961

2,971,338

GAS TURBINE ACCELERATION CONTROL

Rudolph Bodemuller, South Bend, Ind., assignor to The Bendix Corporation, a corporation of Delaware Filed Dec. 6, 1954, Ser. No. 473,108

19 Claims. (Cl. 60—39.28)

This invention relates to fuel systems for gas turbine engines and more particularly to a means for supplying fuel to gas turbine engines in such manner as to avoid compressor stall or surge.

The necessity for dealing with the phenomenon of compressor stall, which at certain parts of the engine acceleration curve becomes a more severe limiting factor than operating gas temperature, has become increasingly great as the performance charcteristics of the available engines have improved. This difficulty is sometimes corrected to some degree in the design of the compressor itself, but if maximum performance capabilities of the engines now available are to be realized, it is essential that some provision be built into the fuel control system for meeting this problem. Numerous schemes have been devised, most of which contemplate, in one way or another, scheduling fuel along a desired pattern in such manner as to avoid the area of compressor stall. This method of controlling involves the difficulty of attempting to schedule around a stall area which varies in shape and position with altitude and ambient temperature conditions. Variations in the stall pattern even occur in compressors for production engines of the same model resulting in the necessity for designing a scheduling control which, when produced in volume, must be capable of keeping the poorest acceptable production unit from running into its stall region. A further difficulty is that a scheduling control cannot take cognizance of changes in fuel requirements as the compressor deteriorates in use. While it is customary to think in terms of weight of fuel supplied to the engine, actually most production metering units only supply a desired volume of fuel so that when variations occur in the heat content per gallon of fuel a schedule must take these differences into consideration. As a result of these variables most commercial controls presently available can only roughly skirt the stall region and in most instances, severely limit the acceleration of the engines with which they are associated. Such a control can be tailor-made for an individual engine in such manner as to schedule the fuel within reasonably close limits, but in a production control the limits imposed by production variations will not allow such close scheduling. It necessarily follows from this limitation that a scheduling control cannot be switched from one type of engine to another without fairly substantial revision. It is, therefore, an object of the present invention to provide a control system which may be simply and readily adjusted for use with gas turbine engines having considerable variations in compressor stall characteristics.

It is another object of the persent invention to provide a control which will allow the engine with which it is associated to skirt the surge region very closely regardless of changes in combustion efficiency or heat content per measure of fuel.

It is a further object to provide a control which will recognize changes in fuel requirements as the engine deteriorates during service.

It is a further object to provide a control which will allow the engine with which it is associated to accelerate to its maximum allowable speed in a time which closely approaches the minimum possible acceleration time.

Other objects and advantages will become apparent from the following specification taken in connection with the accompanying drawings in which.

Figure 1:
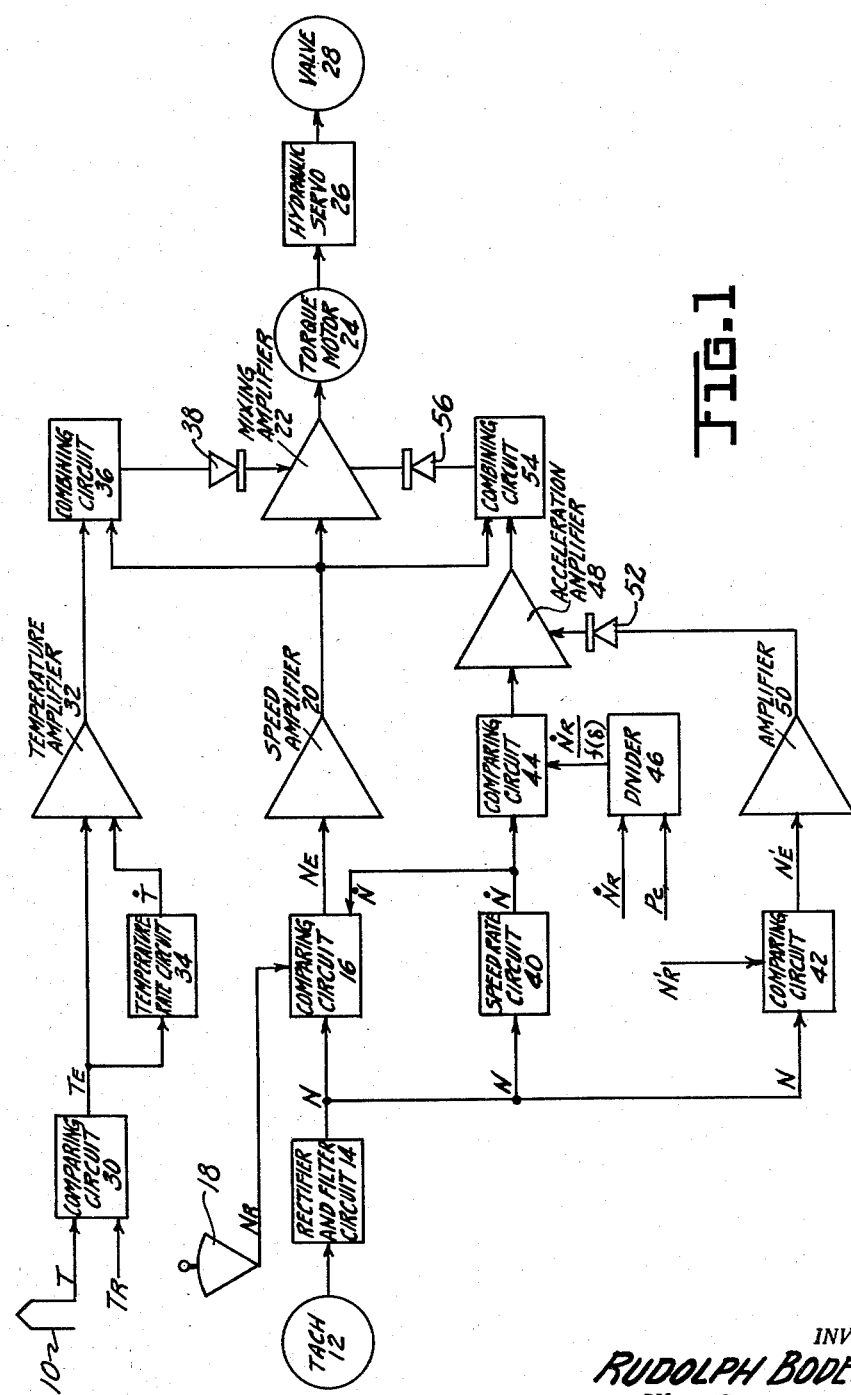
Figure 1 is a schematic diagram of my control system embodied in an electrical circuit for governing fuel supplied to an engine.

Referring now to Figure 1, it will be observed that the system senses two engine operating parameters to control fuel flow, one being temperature, sensed by means of a thermocouple 10 and the other being speed, sensed by means of a tachometer 12.

In this system, speed may be considered to be a primary control parameter, subject to limitations imposed by secondary parameters. It is, therefore, proposed to discuss the complete speed system first and then consider the manner in which limitations are imposed by other factors. The tachometer 10 is driven directly by the engine and emits an alternating current signal which, after being rectified and filtered in circuit 14, constitutes a direct current signal having a voltage directly proportional to engine rotational speed. This signal is shown on Figure 1 as N and is supplied to a comparing circuit 16. The speed request signal $N_R$ is supplied as a result of the action of a pilot's power lever, or throttle, 18 which may produce this speed request signal by moving a slider on a potentiometer in circuit 16. Within this circuit, the speed signal and the speed request signal are compared, thus producing a speed error signal $N_e$ which has a polarity and magnitude established by the direction and amount, respectively, of speed error. This speed error signal is amplified in amplifier 20 and is then supplied to a mixing amplifier 22 which coordinates the speed and other signals and drives a torque motor 24. A hydraulic servo 26 actuated by the torque motor positions the metering valve 28. The windings of the torque motor are so arranged that under-speed signals will be of such polarity as to cause valve 28 to supply more fuel, while overspeed signals will cause the valve to decrease the flow of fuel to the engine.

In the temperature circuit, the thermocouple 10 produces a small direct current signal proportional to the gas temperature to which it is subjected, which may be tailpipe or burner temperature. This signal T is compared in circuit 30 with a direct current temperature reference signal $T_R$ which may be produced by any well known voltage dividing technique. The resultant of these signals, which is indicative of temperature error $T_E$ will also be of magnitude and polarity representative of the amount and direction, respectively, of the departure from the reference value. This temperature error signal is supplied to a temperature amplifier 32 and also to a temperature rate circuit or differentiating amplifier 34 which produces a signal proportional to time rate of change of temperature T. This differentiated signal, which supplies a stabilizing or anti-hunting function, is also supplied to temperature amplifier 32. These signals, as combined, are then fed to a combining amplifier 36 which, it will be seen, is also supplied with a speed error signal from amplifier 20 which is connected in such manner as to be inverted. The output of amplifier 36 which is a signal representative of the algebraic sum of the temperature error and the inverted speed error is then supplied to a rectifier 38. This rectifier is so arranged that it will block all signals except those indicative of over-temperature conditions. Thus the temperature signal will not be supplied to the mixing amplifier 22 unless an over-temperature condition exists or is imminent. Actually, the signal which is supplied to the rectifier 38 will be of proper polarity to pass the rectifier even though the temperature in the engine may be slightly below the limit because of the anticipating effect produced by combining with the inverted speed error signal. Normally the magnitude of the temperature error signal will be much greater than that of the speed error signal to assure that the temperature signal will always be capable of overriding the speed signal. When the rectifier does pass the combined signal to the amplifier 22, the speed error signal from speed amplifier 20 and the minus speed error component from amplifier 36 cancel and the temperature error signal remains as the controlling factor for torque motor 24 and, hence, valve 28. This switching circuit is explained in detail in the copending application of David R. Miller and George Brown (common assignee), Serial No. 452,029, filed August 25, 1954.

In addition to being supplied to the comparing circuit 16 the speed signal N is also supplied to a differentiating or speed rate circuit 40 and to and additional speed comparing circuit 42. The output of circuit 40 which is proportional to the time rate of change of speed is supplied to comparing circuit 16 where it provides an anti-hunting signal, and also to an additional comparing circuit 44. This circuit has, in addition to the speed rate input, an input from a divider circuit 46. This divider has input signals which constitute an acceleration reference signal and a signal proportional to compressor inlet pressure and an output which is, effectively, an acceleration reference corrected for altitude conditions ($N_R$ divided by a function of delta where delta is a ratio of actual to N.A.C.A. standard pressures). Circuit 44 compares this corrected acceleration reference with the acceleration input from speed rate circuit 40 and thereby produces an acceleration error signal which is supplied to an acceleration amplifier 48.

The speed comparing circuit 42 has, in addition to the speed input, an input from a speed reference. This reference signal, which may be produced by any well known voltage dividing technique, is chosen to represent the lowest practical value of engine rotational speed at which the surge area may be considered to have been passed, thus permitting the rate of fuel flow to be sharply increased. Let us assume that, for a particular engine, this value is at 80% of maximum allowable speed. The reference signal supplied to circuit 42 will be representative of the 80% speed and the output of this circuit will have a magnitude and polarity depending upon the amount and direction of speed error from the reference. This signal is amplified in amplifier 50 and is fed to acceleration amplifier 48 through a rectifier 52. This rectifier operates in a manner similar to rectifier 38 in that it will pass only those signals having a polarity representative of speeds above the reference value. Therefore if speeds are below 80% of maximum, the amplifier 48 will receive and amplify only the acceleration error signal from circuit 44, but if speeds are above 80%, the speed error signal passed by rectifier 52 will be amplified. The output of acceleration amplifier 48 is supplied to a combining circuit 54 which receives an inverted speed error signal from amplifier 20 in the same manner as does circuit 36. The output of this combining circuit is supplied to the mixing amplifier 22 through a rectifier 56 which allows only signals representative of accelerations above the reference value or speeds above our hypothetical 80% of maximum value to pass. In this respect it operates in a manner entirely analogous to rectifiers 38 and 52.

Figure 2:
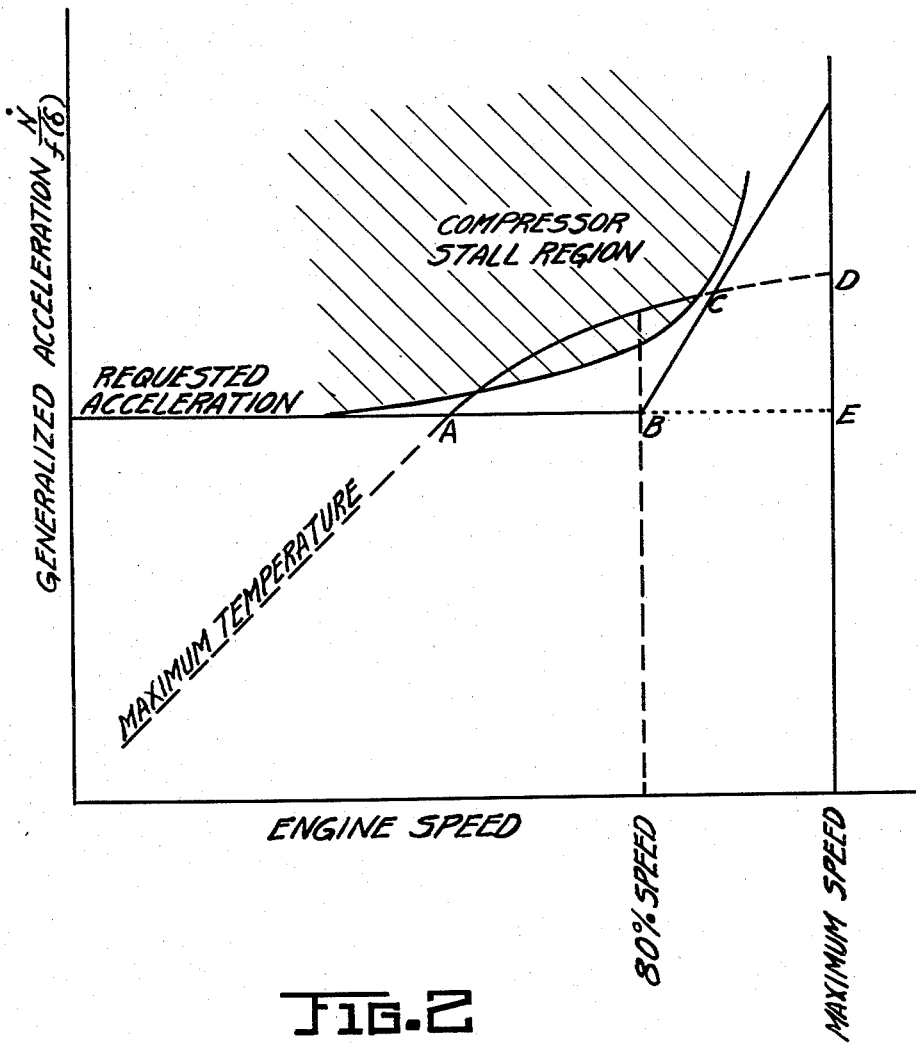
Figure 2 is a graph representing a typical acceleration schedule of a gas turbine engine having a fuel control system incorporating my invention.

In operation, the control system described above contemplates the use of speed as a primary controlling factor subject to limits imposed by operating temperature and acceleration. Figure 2 is a graph which indicates the type of acceleration control contemplated. In this graph generalized acceleration is plotted on the vertical axis and engine speed on the horizontal axis. By generalized acceleration is meant acceleration corrected for N.A.C.A. standard altitude conditions of ambient pressure. The primary control function, which is speed, will not impose any limit on the acceleration until the requested speed, which in this case will be presumed to be maximum speed, is approached. At the moment the engine is started, none of the control factors place any limiting factor on fuel flow. It therefore increases until the maximum temperature, which is the most severe limiting parameter at the start of acceleration is reached. At this point the output signal from the temperature circuit is of proper polarity to conduct through rectifier 38 and a temperature limit is imposed on fuel flow. Acceleration continues up the maximum temperature line until it reaches the requested acceleration value. At this point (Point A, Figure 2) acceleration becomes a more severe limiting factor than temperature and this is reflected by the conduction of rectifier 56. Acceleration will continue to be limited along a uniform value of acceleration until the danger of entering the compressor stall or surge region, which is indicated on the graph by a shaded area, has been passed. It will be noted that the solid line indicating an extension of the maximum temperature line extends across the surge area, thus pointing up the fact that maximum temperature cannot be used as a limiting factor much beyond point A. When there is no longer any danger of accelerating into the surge region, the acceleration may be increased as a linear function of engine speed. In the hypothetical engine chosen herein this increased acceleration was set to begin when the engine reached 80% of maximum speed at which time the rectifier 52 begins to conduct. This is reflected on Figure 2 by a sharp bend in the requested acceleration line at point B which shows a rapidly increasing acceleration value until the operating temperature limit again is reached at point C. Temperature then remains as the most severe limiting factor on acceleration until the maximum allowable speed is reached at point D. Actually the speed rate circuit will cause a sharp deceleration in the region immediately approaching the maximum speed in order to avoid overshooting of this value, but reference to this and other anticipation functions has been omitted to simplify the discussion of the operation. It will be observed by reference to the requested acceleration line on Figure 2 that this line could be extended to intersect the maximum speed line at point E as is suggested by the dotted line. This will give acceptable acceleration for most installations although the figure formed by the points B, C, D, and E represents an area of acceleration which will be lost. The gain, of course, is in the elimination of the circuitry necessary to bend the requested acceleration line at B which on Figure 1 includes circuit 42, amplifier 50 and rectifier 52.

Figure 3:
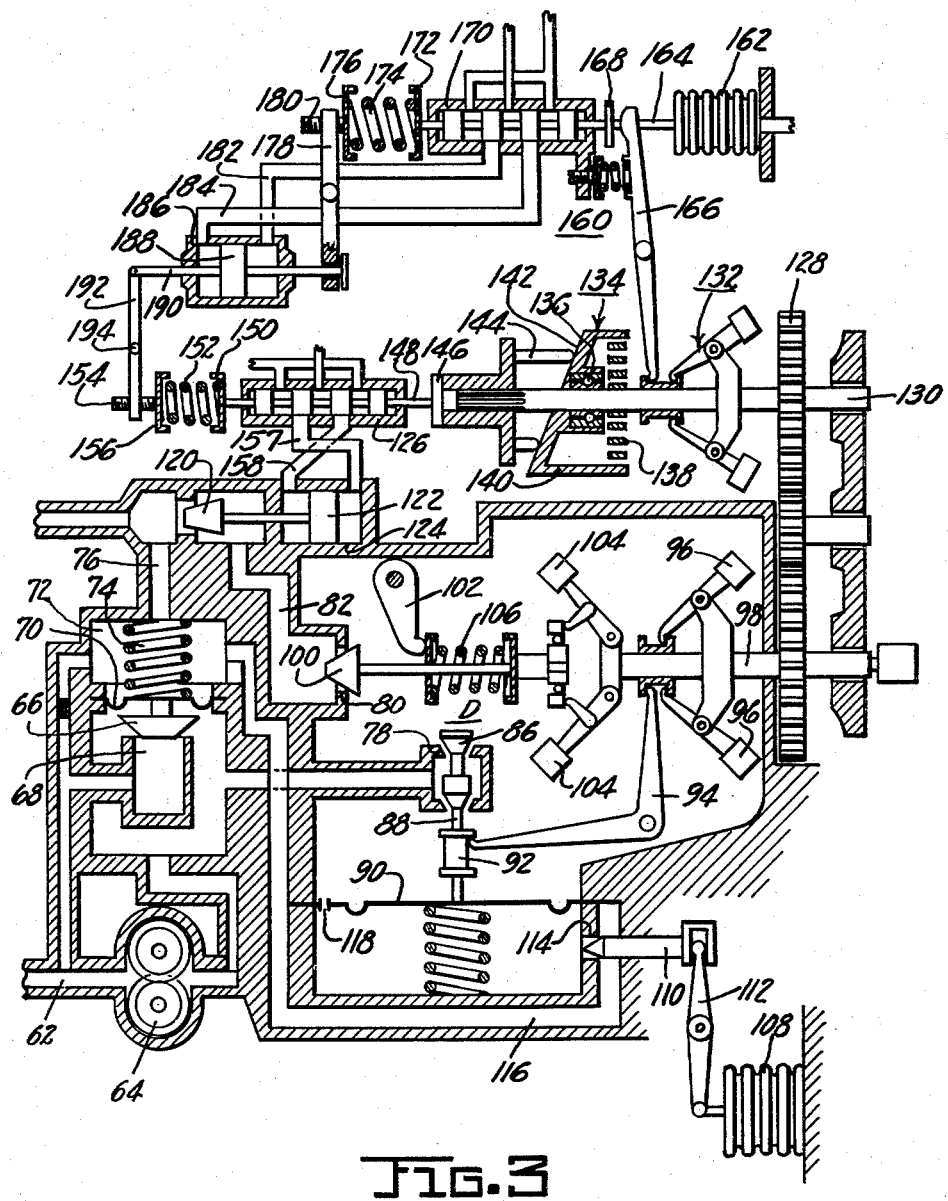
Figure 3 is a schematic diagram of my control embodied in a mechanical system for governing fuel supplied to an engine.

In Figure 3 is shown a means for embodying my invention in a mechanical fuel control system. This system contemplates superimposing the effect of an acceleration limiter upon the output of a well known type of mechanical control system which feeds fuel along a predetermined schedule and corrects the flow for changes in engine rotational speed and ambient pressure and temperature. The main control unit is provided with a fuel inlet 62 having mounted therein an engine driven fuel pump 64 which draws fuel from a source, not shown, through the aforementioned pipe 62. A bypass valve 66 controls a channel 68 leading back to the inlet or low pressure side of the pump. The bypass valve is mounted on a diaphragm 70 forming one wall of a chamber 72 and is urged toward closed position by a spring 74. The chamber 72 is vented to the fuel discharge side of the acceleration limiter fuel valve by a conduit 76. The fuel supply pressure at the pump outlet will therefore be maintained at a substantially constant value above the discharge side of the acceleration fuel valve as determined by the strength of the spring 74.

Fuel from the pump discharge flows through valve port or orifice 78 into fuel chamber D and thence through metering orifice or restriction 80 into conduit 82. The orifice 78 is controlled by a regulator valve 86 of the poppet type and is equipped with a stem 88 operatively connected to a metering head diaphragm 90 which forms a movable wall of fuel chamber D. Also attached to stem 88 is a spool 92 which is connected through a linkage 94 to a pair of centrifugal regulator weights 96. These weights are attached to a shaft 98 which is directly driven by the engine. The arrangement of the weights and diaphragm is such that the force of the centrifugal weights tending to open the regulator valve is opposed by the fuel pressure on the metering head diaphragm acting to close the regulator valve. The regulator valve maintains a differential force of fuel pressures across the metering head diaphragm to balance the thrust force supplied by the centrifugal weights.

The fuel from the regulator unit passes through the governor valve 100 and out into passage 82. The governor valve with its associated components supplies the primary speed function of the control system, the request being supplied by a pilot's control lever 102 and the actual speed being sensed by a pair of centrifugal weights 104. These components oppose each other through a spring 106. For every position of throttle lever 102 there is a definite spring force set up tending to open governor valve 100. For every engine speed there is a definite thrust force supplied by weights 104 tending to close valve 100. The governor valve, consequently, will seek a position allowing the fuel flow to build up engine speed until the thrust force from the centrifugal weights equals the spring force. The governor valve will then meter fuel in such a manner as to maintain a substantially constant engine speed as set up by the throttle lever.

Density compensation is provided by means of a bellows 108 controlling the position of a contoured needle 110 through a linkage 112. The bellows is subjected to the engine compressor inlet density and moves the contoured needle in response to the changes in compressor inlet pressure and temperature. A drop in compressor inlet pressure or a rise in compressor inlet air temperature will cause the bellows to expand, thereby moving needle 110 out of its orifice 114. This action will create a lower pressure differential across the needle and orifice. It will be observed that one side of orifice 114 communicates through passage 116 with chamber 72 and hence, with the downstream side of limiter valve 120 while the other side communicates with metering head diaphragm 90. In diaphragm 90 is a bleed 118 which, in conjunction with orifice 114, provides a path which is in parallel with the main fuel flow across governor valve 100 and valve 120. The lower pressure differential across orifice 114 results in a higher differential across orifice 118 and diaphragm 90, thus moving diaphragm 90 to the left and moving regulator valve 86 in a closing direction. In this manner the density compensating circuit reduces fuel flow with a reduction in compressor inlet pressure or a rise in compressor inlet air temperature. When opposite effects of pressure and temperature are experienced, the system acts to increase fuel flow. This speed-density system is well known in the art and has an output which very closely follows a turbine inlet temperature line. Because there is no compensation for compressor stall it is necessary, however, to design into the unit a very conservative acceleration schedule. In the applicant's system, the flow from this speed-density unit is subjected to the further limiting effect of an acceleration limiter which acts through valve 120 immediately downstream of the governor valve 100. This valve is actuated by a piston 122 in a cylinder 124. Movement of the piston is controlled through a servo valve 126.

The servo valve 126 is controlled by an acceleration limiting unit driven by a gear 128 on a shaft 130. On this shaft are a flyweight governor unit 132 which supplies a speed signal to a pressure compensating unit to be described below and an inertia-type accelerometer 134.

Accelerometer 134 is mounted concentrically with shaft 130 on bearing 136 and is free to move radially relative to shaft 130 except for the action of a spiral or clock-type spring 138 which is solidly attached to both shaft 130 and to the inertia member 140. In the accelerometer 134, which is of the type well known in the art, inertia member 140 will rotate at substantially the same speed as shaft 130 during periods when the shaft maintains a constant speed; however, should shaft 130 be accelerated or decelerated inertia member 140 will tend to lag the shaft in reflecting this change. This lag will cause member 140 to be radially displaced with relation to shaft 130 resulting in an increase in the force on spring 138. It will be observed that member 140 has a tapered face 142 and that a follower member 144 rides against this tapered face. Member 144 is arranged to rotate on shaft 130 but it is also arranged to slide axially along shaft 130 while following the contours of tapered face 142. From this arrangement, then, it will be observed that follower 144 will suffer an axial displacement in following the face 142 when inertia member 140 suffers a radial displacement from shaft 130. This, of course, occurs only during acceleration of deceleration. Riding directly against follower member 144 is a plate 146 attached to a shaft 148 which communicates with hydraulic servo valve 126. At the other end of shaft 148 is a plate 150 which is urged toward the right by means of a compression spring 152. A screw 154 adjusts by varying the position of a plate 156, the amount of compression to which the spring 152 is subjected, thereby providing a means of calibrating the acceleration limiter.

The hydraulic servo valve 126 has an interior chamber which is divided into several compartments by spools which are solidly attached to shaft 148. The central chamber is connected with a source of fluid under pressure (not shown) while the adjacent chambers are connected to the return side of said source. Also communicating with servo valve 126 are conduits 157 and 158 communicating with opposite sides of piston 122 in cylinder 124 thereby determinating the positioning of acceleration limiting valve 120.

It is obvious that the system just described provides merely an acceleration limiter with no compensation for changes in engine rotational speed or altitude conditions. This compensation is provided by a unit shown generally at 160 having a pressure sensitive bellows 162 which may reflect changes in compressor inlet pressure attached to a shaft 164 and a linkage 166 which is responsive to changes in speed as reflected by centrifugal device 132. Shaft 164 carries a plate 168 against which link 166 exerts a force after taking up a certain amount of lost motion. This arrangement is designed so that centrifugal unit 132 is effective only after a definite minimum speed is reached. The force from link 166 is transmitted by shaft 164 to a servo valve 170 and to a plate 172 which exerts a force against a spring 174. A second plate 176 is attached to one end of a link 178 by means of an adjusting screw 180. Servo valve 170 is connected to a source of fluid under pressure (not shown) and operates in a manner analogous to servo valve 126 in controlling the flow of fluid through conduits 182 and 184 to a cylinder 186 and a piston 188. Piston 188 carries a shaft 190 which exerts a force against the lower end of link 178 when said shaft and piston are moved to the left. In this manner the position of spool 188 is defined and the acceleration request becomes directly proportional to compressor inlet pressure when engine speed is below a predetermined minimum value and when engine speed is above said minimum, to compressor inlet pressure and speed. The other end of shaft 190 is fastened to a link 192 which pivots around a fulcrum 194 and thereby changes the position of plate 156 and the force on spring 152. This spring is thereby recalibrated to modify the acceleration signal with changes in speed and pressure values. This speed and pressure compensated acceleration limiter, when combined with the speed-density control described above, results in a greatly improved acceleration pattern because the speed-density unit can be designed to operate at considerably higher temperature values inasmuch as the acceleration limiter is capable of keeping the engine from entering the stall region.

To understand the operation of my mechanical control system, let us assume that the engine with which the control is associated is accelerated to a maximum allowable speed under constant pressure and temperature conditions. The request for more fuel is transmitted from control lever 102 which increases the force on spring 106 and causes valve 100 to move away from orifice 80. An increased amount of fuel is supplied to conduit 82 which is limited during acceleration only by regulator valve 86 which is gradually moved in an opening direction as speed increases through the action of centrifugal weights 96, linkage 94 and spool 92, until such time as the acceleration control senses a rate of acceleration which is sufficient to actuate servo valve 126. The piston 122 is then moved to the left thus moving valve 120 in a closing direction, thereby providing a more severe limiting factor on fuel flow than is provided by valve 100 until the desired maximum speed is reached. The governor system including centrifugal weights 104, spring 106 and valve 100 then acts to reduce fuel flow to a value which will provide steady state operation at maximum speed. With reference to Figure 2, this system provides an acceleration pattern which closely approximates the maximum temperature line up to point A and then follows line A–B–E at a uniform acceleration until maximum speed is reached. Let us now assume that the engine which has just been accelerated to maximum speed is subjected to a significant decrease in pressure of the air supplied to the compressor thereof. The density compensating bellows 108 on the main control unit and the pressure sensing bellows 162 on the acceleration unit act simultaneously to reduce fuel flow. Bellows 108 expands thereby pulling valve 110 out of orifice 114 and reducing the pressure drop across parallel orifice 80 in the manner discussed above. Bellows 162 will contract thereby allowing the spools in servo valve 170 to move to the right and reducing the force on spring 174. Fluid under pressure is transmitted through conduit 184 to the left side of piston 188. As piston 188 moves to the right it carries shaft 190 and causes link 192 to rotate around fulcrum 194 in such manner that plate 156 reduces its force against spring 152. Plate 150 and the spools in servo valve 126 are then moved to the left causing fluid under pressure to be supplied to the right side of piston 122 and causing valve 120 to be moved in a closing direction.

Although my invention has been described herein in connection with only two specific embodiments, it is contemplated that it is applicable to many established types of engine controls.

I claim:

1. In a fuel control system for a gas turbine engine having a fuel valve and electrically actuated means for driving said fuel valve: a tachometer for providing a signal responsive to changes in engine speed, means for converting the output signal of said tachometer into a direct current voltage proportional to engine rotational speed, a power lever and means operably connected to said lever for producing a direct current speed reference voltage proportional to a desired engine speed, means producing a speed error signal by comparing said speed signal with said speed reference signal, a thermocouple for producing a voltage proportional to engine combustion gas temperature, means producing a reference voltage proportional to a maximum allowable value of engine combustion gas temperature, a comparing circuit for producing a temperature error signal by comparing said temperature and temperature reference signals, means using said temperature error signal to produce a rate of change of temperature signal, means combining said temperature error and temperature rate signals, circuit means utilizing said speed signal to produce a signal proportional to turbine acceleration, means producing a signal corresponding to a desired acceleration value including means for correcting said desired acceleration value for changes in ambient pressure conditions, a comparing circuit for producing an acceleration error signal, an amplifier for amplifying said acceleration error signal, a first combining means for combining said speed error signal with said combined temperature error and temperature rate signals, a second combining means for combining said speed error signal with said amplified acceleration error signal, a mixing amplifier, means supplying said speed error signal to said mixing amplifier, means supplying the signal from said first combining means to said mixing amplifier only when said signal is of polarity corresponding to an over-temperature condition, means supplying the signal from said second combining means to said mixing amplifier only when said signal is of polarity corresponding to an acceleration in excess of said desired acceleration value, and connections from said mixing amplifier to said electrically actuated means.

2. In a fuel control system as set forth in claim 1, means producing a second speed reference signal proportional to a fixed percentage of maximum allowable engine rotational speed, a circuit for comparing said signal with said direct current voltage proportional to engine rotational speed and thereby producing a second speed error signal, means for amplifying said second speed error signal, and means supplying said second speed error signal to said acceleration error signal amplifier only when said second speed error signal is representative of rotational speed exceeding said second speed reference value.

3. In a fuel control system for a gas turbine engine, a fuel valve, electrically actuated means for controlling the position of said fuel valve, a speed governor for producing a first electrical voltage proportional to the difference between actual and desired values of engine rotational speed, a temperature limiter for producing a second electrical voltage proportional to the difference between an actual and a desired value of engine combustion gas temperature, means producing a third voltage proportional to the difference between actual engine acceleration and a desired acceleration value, means supplying said first voltage to said electrically actuated means, a rectifier arranged to supply said second electrical voltage to said actuating means only when said voltage is indicative of an over-temperature condition, and a rectifier arranged to supply said third voltage to said actuating means only when said voltage is indicative of an acceleration rate greater than that desired.

4. A fuel control system as set forth in claim 3 wherein said third voltage producing means contains a circuit whereby said third voltage is modified by altitude conditions.

5. In a fuel control system for gas turbine engines, means producing a first voltage proportional to engine rotational speed, means producing a second voltage proportional to a desired rotational speed, means combining said first and second voltages to produce a speed error voltage, means producing a third voltage proportional to engine combustion gas temperature, means producing a fourth voltage proportional to a reference combustion gas temperature, means combining said third and fourth voltages to produce a temperature error voltage, means producing a fifth voltage proportional to actual engine acceleration, means producing a sixth voltage proportional to a desired value of engine acceleration, means combining said fifth and sixth voltages to produce an acceleration error voltage, a mixing amplifier connected to said speed error voltage producing means, means for supplying said temperature error voltage to said mixing amplifier only when said voltage is indicative of an over-temperature condition, means supplying said acceleration error voltage to said mixing amplifier only when said voltage is indicative of acceleration in excess of said desired value, a fuel valve, and means driven by said mixing amplifier for driving said fuel valve.

6. A fuel control system as set forth in claim 5 wherein said fifth voltage is also supplied to said speed error signal producing means thereby providing a speed anticipation signal.

7. A fuel control system as set forth in claim 5 wherein means are provided for producing a voltage proportional to rate of change of engine combustion gas temperature and for combining said voltage with said temperature error voltage.

8. A fuel control system as set forth in claim 5 wherein means are provided to vary said sixth voltage with changes in ambient temperature conditions.

9. A fuel control system as set forth in claim 5 wherein means are provided for producing a voltage proportional to a fixed value of engine rotational speed and combining said voltage with said first voltage to produce a second speed error voltage, and for connecting said error voltage to said acceleration error voltage producing means only when said second speed error voltage is representative of speeds in excess of said fixed value.

10. A fuel control system as set forth in claim 5 wherein said speed error voltage is supplied in inverted form to each of said temperature error voltage producing means and said acceleration error voltage producing means.

11. In a fuel control system for a gas turbine engine having a first means producing a signal proportional to the difference between an actual and a desired engine rotational speed, a second means producing a signal proportional to the difference between actual and desired value of an additional engine operating condition related to power output, and means responsive to said first and second means for controlling the flow of fuel to said engine: a third means producing a signal proportional to the difference between actual and desired values of engine acceleration, and speed responsive means operative during engine acceleration for introducing the signal from said third means to override said signal from said second means to limit said fuel flow.

12. In a fuel control system for a gas turbine engine, a first means for controlling fuel flow to accelerate said engine at a substantially constant combustion gas temperature, a second means for controlling fuel flow to accelerate said engine at a constant acceleration, and speed responsive means for transferring control of fuel flow from said first means to said second means.

13. A system for supplying liquid fuel to the burner of a gas turbine engine as set forth in claim 12 wherein said second means includes an inertia-type accelerometer, a servo valve operatively connected to said accelerometer, a resilient member and means for adjusting said member for providing an acceleration reference, a governor for varying said reference with changes in engine rotational speed, a cylinder and a piston within said cylinder controlled by said servo valve, and means operably connected to said piston for varying the flow through said conduit.

14. In a fuel control system for a gas turbine engine, a first means for controlling fuel flow to accelerate the engine along a predetermined schedule at a substantially constant combustion gas temperature; a second means for controlling fuel flow to accelerate said engine at a constant acceleration comprising means responsive to rate of change of engine rotational speed, a first resilient member opposing said last named means for establishing an acceleration reference, means for varying the force exerted by member with changes in speed and compressor pressure including a servo valve, a bellows connected to said servo valve, a speed responsive means operatively connected to said servo valve, a second resilient member for opposing the force exerted by said bellows and said speed responsive means, a cylinder connected to said servo valve, a piston in said cylinder, a shaft carried by said piston, a linkage operatively connected between one end of said shaft and said first resilient member, a second linkage operatively connected between the other end of said shaft and said second resilient member; and said speed responsive means operable to transfer control of fuel flow from said first means to said second means.

15. The method of metering fuel to a gas turbine engine comprising supplying fuel in such manner as to accelerate said engine at a predetermined temperature over part of the acceleration range, at a predetermined acceleration value over part of the acceleration range, and switching from control on temperature to control on acceleration as a function of engine rotational speed.

16. The method of metering fuel to a gas turbine engine comprising supplying fuel in such manner as to accelerate said engine at a predetermined temperature over part of the acceleration range, at a predetermined acceleration over part of the acceleration range, and transferring from control on temperature to control on acceleration over the portion of the acceleration range where compressor stall may be encountered.

17. In a fuel control system for a gas turbine engine having a valve, means producing a signal proportional to engine acceleration, means producing an acceleration reference signal including means responsive to instantaneous values of engine rotational speed corrected for altitude conditions, a circuit for comparing said acceleration and acceleration reference signals to produce an acceleration error signal, and means responsive to said error signals for positioning said valve.

18. In a system for controlling the rate of fuel fed to a gas turbine engine, a pump, a fuel conduit and a fuel metering orifice in said conduit: means for varying the effective area of said orifice, means for regulating the pressure drop across said orifice, an element responsive to engine speed arranged to regulate one of said means to automatically increase the fuel flow through the orifice upon an increase in speed and a power control device arranged to adjustably regulate one of said means such that fuel flow is scheduled to produce engine acceleration at a substantially constant combustion gas temperature limit; a governor operatively associated with said power control device and becoming effective automatically to reduce the fuel flow when a selected engine speed is exceeded; means responsive to engine acceleration for limiting flow through said conduit over a portion of the acceleration range of the engine to accelerate said engine at a substantially constant acceleration, and speed responsive means effective to transfer control of fuel flow from said temperature limiting means to said acceleration limiting means.

19. In a system for controlling the rate of fuel fed to a gas turbine engine, a pump, a fuel conduit and a fuel metering orifice in said conduit: means for varying the effective area of said orifice, means for regulating the pressure drop across said orifice, an element responsive to engine speed arranged to automatically increase the fuel flow through the orifice upon an increase in speed, and a power control device arranged to adjustably regulate one of such means and coordinated with said element such that the fuel flow is scheduled to produce engine acceleration at a substantially constant combustion temperature; a governor operatively associated with said power control device and becoming effective automatically to reduce the fuel flow when a selected engine speed is exceeded; and means including an inertia-type accelerometer, a resilient member acting in opposition to said accelerometer and means for adjusting said member for providing an acceleration reference, a servo valve responsive to the difference between said accelerometer acceleration reference signals and a speed responsive device for varying said reference with engine rotational speed, a pressure responsive member for varying said reference with changes in compressor pressure, a cylinder and a piston in said cylinder controlled by said servo valve, means operatively connected to said piston for limiting the flow through said conduit to accelerate said engine at a constant acceleration rate, said speed responsive device being effective to transfer control of fuel flow from said temperature limiting means to said acceleration limiting means.

References Cited in the file of this patent

UNITED STATES PATENTS

| | | |
|---|---|---|
| 2,633,830 | McCourty et al. | Apr. 7, 1953 |
| 2,648,194 | Jorgensen et al. | Aug. 11, 1953 |
| 2,662,372 | Offner | Dec. 15, 1953 |
| 2,691,268 | Prentiss | Oct. 12, 1954 |
| 2,698,654 | Jorgensen et al. | Jan. 4, 1955 |
| 2,705,864 | Peters | Apr. 12, 1955 |
| 2,761,495 | Greenland | Sept. 4, 1956 |
| 2,846,846 | Mock | Aug. 12, 1958 |